(12) United States Patent
Tong et al.

(10) Patent No.: US 12,214,645 B2
(45) Date of Patent: Feb. 4, 2025

(54) HEATING DEVICE WITH A HOUSING ASSEMBLY

(71) Applicant: VALEO AUTOMOTIVE AIR CONDITIONING HUBEI CO. LTD., Hubei (CN)

(72) Inventors: Ziran Tong, Hubei (CN); Kong Zhang, Hubei (CN)

(73) Assignee: VALEO AUTOMOTIVE AIR CONDITIONING HUBEI CO. LTD., Hubei (CN)

( * ) Notice: Subject to any disclaimer, the term of this patent is extended or adjusted under 35 U.S.C. 154(b) by 764 days.

(21) Appl. No.: 17/434,154

(22) PCT Filed: Feb. 27, 2020

(86) PCT No.: PCT/CN2020/076940
§ 371 (c)(1),
(2) Date: Aug. 26, 2021

(87) PCT Pub. No.: WO2020/173479
PCT Pub. Date: Sep. 3, 2020

(65) Prior Publication Data
US 2022/0169092 A1 Jun. 2, 2022

(30) Foreign Application Priority Data
Feb. 28, 2019 (CN) .......................... 201910149300.9

(51) Int. Cl.
*B60H 1/03* (2006.01)
*B60H 1/00* (2006.01)

(52) U.S. Cl.
CPC ......... *B60H 1/034* (2013.01); *B60H 1/00428* (2013.01); *B60H 1/00521* (2013.01)

(58) Field of Classification Search
CPC ...................... B60H 1/00428; B60H 1/00521; B60H 1/034; B60H 1/2225; B60H 2001/2278; F24H 3/0435; F24H 3/0441; H05B 3/06
See application file for complete search history.

(56) References Cited

U.S. PATENT DOCUMENTS

| | | | | |
|---|---|---|---|---|
| 4,940,041 A | * | 7/1990 | Riedmaier | B60H 1/2203 126/110 B |
| 2010/0122978 A1 | * | 5/2010 | Oh | H05B 3/50 219/540 |

(Continued)

FOREIGN PATENT DOCUMENTS

| | | |
|---|---|---|
| CN | 101453060 A | 6/2009 |
| CN | 102770720 A | 11/2012 |

(Continued)

OTHER PUBLICATIONS

International Search Report with Written Opinion in corresponding International Application No. PCT/CN2020/076940, mailed Jun. 2, 2020 (7 pages).

(Continued)

*Primary Examiner* — Joe E Mills, Jr.
(74) *Attorney, Agent, or Firm* — Osha Bergman Watanabe & Burton LLP

(57) ABSTRACT

A heating device for a vehicle is described. The heating device includes a heater core and a housing assembly. The housing assembly includes a housing configured with a protruded portion, a first terminal, and a second terminal. The first terminal is configured on the protruded portion of the housing and adapted to be connected with a first bus bar. The second terminal is configured on a first end of the housing and adapted to be connected with a second bus bar. The first bus bar and the second bus bar are connected to the heater core to provide an electrical connectivity to the heater core. The first terminal and the second terminal are laterally (Continued)

offset to each other, and are at least partially on opposite sides of a reference line coinciding with an edge of a printed circuit board received in the housing.

10 Claims, 8 Drawing Sheets

(56) References Cited

U.S. PATENT DOCUMENTS

| | | | |
|---|---|---|---|
| 2015/0108117 A1 | 4/2015 | Gries | |
| 2016/0039266 A1* | 2/2016 | De Souza | H05K 1/0201 |
| | | | 219/202 |
| 2020/0369121 A1 | 11/2020 | Puzenat et al. | |

FOREIGN PATENT DOCUMENTS

| | | |
|---|---|---|
| CN | 102917892 A | 2/2013 |
| CN | 105210456 A | 12/2015 |
| CN | 105917117 A | 8/2016 |
| CN | 106642654 A | 5/2017 |
| CN | 107206866 A | 9/2017 |
| CN | 109075470 A | 12/2018 |
| CN | 109210768 A | 1/2019 |
| DE | 202009005582 U1 | 9/2010 |
| EP | 1884383 A1 | 2/2008 |
| EP | 2017548 A1 | 1/2009 |
| EP | 3228950 A1 | 10/2017 |
| KR | 20100049397 A | 5/2010 |
| KR | 20100064775 A | 6/2010 |

OTHER PUBLICATIONS

Chinese Office Action issued in Chinese Application No. 201910149300.9 mailed on Jul. 1, 2023 (8 pages).
The Extended European Search Report issued in European Application No. 20763214.2, dated Dec. 15, 2022 (8 pages).

* cited by examiner

HEATING DEVICE WITH A HOUSING ASSEMBLY

The present subject matter generally relates to a housing assembly, and in particularly, to a housing assembly for facilitating electrical connectivity to a heater core of a Heating Ventilation and Air conditioning (HVAC) system.

Generally, HVAC systems are provided in a vehicle to provide comfort driving to the driver and the occupants. The HVAC system may include heat exchangers to provide either hot air or cold air based on a mode of operation of the heat exchangers. To provide hot air to the cabin, hot fluid is received from an engine of the vehicle if the vehicle is an internal combustion engine vehicle. In case the vehicle is an electric vehicle or a hybrid vehicle, a heater core having heating elements provides hot air to the cabin of the vehicle. The heating elements are electrical heating elements powered by an electrical source. In some case, the heater core is used to cold start the engine of the vehicle when the vehicle is in a cold region. If the heater core is utilized to provide comfort conditions to the passengers inside the vehicle's cabin, the heater core is placed in a downstream of an evaporator of the HVAC unit.

Generally, the heater core is coupled to housing for providing electrical insulation for electrical terminals of the heating elements of the heater core. The electrical terminals of the heating elements are extended to the housing and coupled to bus bars provided in the housing. The bus bars are connected with a pair of wires (e.g., pigtail connection) to provide electrical energy to the bus bars. In turn, the bus bars transmit electrical energy to the heating elements in the heater core. Conventionally, both of the wires are adapted to enter into the housing from one side of the housing to enable contact with the electrical terminals of the heating elements. However, such design may cause electrical leakage between the electrical terminals. By providing two connections next to each other may lead to potential electrical insulation issues between the two connections. Further, such design of connections may be cumbersome to connect the two wires with the bus bar.

As shown in FIG. 1A, a conventional housing assembly 10 provides housing for a pair bus bars 12 that is adapted to energies a heating element (not shown in FIG. 1A) of a heater device. The pair of bus bars 12 may include terminals and adapted to connect with the heating element. The pair of bus bars 12 may be connected with two wires 14, 16 to power the heating element. The first wire 14 and the second wire 16 enter into the conventional housing assembly 10 from a side 18, where the first wire 14 and the second wire 16 are adjacent to each other. The first wire 14 and the second wire 16 are connected to the corresponding bus bars through terminal connections 20, 22 respectively. As the terminal connections 20, 22 are adjacent to each other, there is a potential risk of electrical leakage between the terminal connections 20, 22 of the first wire 14 and the second wire 16 that may to cause short-circuiting.

Accordingly, there is need for a simple design to connect the wires with the bus bar which eliminates risk of electrical leakage between the connections in the design.

An object of the present invention is to provide a housing assembly that obviates the drawbacks associated with the conventional housing assembly.

Another object of the present invention is to provide a housing to encapsulate terminals, which connects heating elements and wires, to provide insulation between terminals.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

In view of the foregoing, an embodiment of the invention herein provides a housing assembly for facilitating electrical connectivity to a heater core of a heating device. The housing assembly includes a housing configured with a protruded portion, a first terminal, and a second terminal. The first terminal is configured on the protruded portion of the housing and adapted to be electrically connected with a first bus bar. The second terminal is configured on a first end of the housing and adapted to be electrically connected with a second bus bar. The first bus bar and the second bus bar are connected to the heater core to provide an electrical connectivity to the heater core. Further, the first terminal and the second terminal are laterally offset to each other, and are at least partially on opposite sides of a reference line coinciding with an edge of a printed circuit board received in the housing.

In one embodiment, the housing includes a first side wall and a second side wall adapted to be coupled to the first side wall. The first side wall and the second side wall may forms a base portion.

In another embodiment, the printed circuit board is provided on a second end of the housing in such a way that the first terminal and the second terminal are adjacent to the orthogonal sides of the printed circuit board. In yet another embodiment, the housing assembly comprises a plurality of connectors that is connected to the first bus bar and the second bus bar to couple the first bus bar and the second bus bar with the printed circuit board. In yet another embodiment, the housing assembly comprises a top portion adapted to couple with the housing for encapsulating of the first terminal, the second terminal and the printed circuit board. The top portion and the housing may be of an electrically insulated material.

In yet another embodiment, the housing assembly further comprising at least one locking assembly to retain the housing and the top portion in a locked state. Further, the at least one locking assembly being a snap-fit assembly having is complementary engagement members provided on the housing and the top portion to lock the housing with the top portion. The first terminal and the second terminal are connected to an electrical energy source by a pair of electrical conductors.

In another aspect of the invention, a heating device is provided for a vehicle. The heating device includes a heater core and the housing assembly. The heater core may further include one or more heating elements with corresponding electrical contacts. The housing assembly includes a housing configured with a protruded portion, a first terminal, and a second terminal. The first terminal is configured on the protruded portion of the housing and adapted to be electrically connected with a first bus bar. The second terminal is configured on a first end of the housing and adapted to be electrically connected with a second bus bar. The first bus bar and the second bus bar are connected to the heater core to provide an electrical connectivity to the heater core. Further, the first terminal and the second terminal are laterally offset to each other, and are at least partially on opposite sides of a reference line coinciding with an edge of a printed circuit board received in the housing.

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

It must be noted that the figures disclose the invention in a detailed enough way to be implemented, the figures helping to better define the invention if needs be. The invention should however not be limited to the embodiment disclosed in the description.

The present subject matter relates to concepts relating to a housing assembly for housing electrical terminals of heating elements of a heating device. According to another aspect, the present subject matter relates to a heating device provided with a housing assembly for housing the electrical terminals of the heating elements. The housing assembly may include a housing having a protruded portion. Further, a couple of terminals are provided on the housing, for example, one terminal is provided on the protruded portion and another terminal is provided on the portion other than the protruded portion. The couple of terminals are connected to heating elements through a pair of bus-bars. As the terminals are laterally offset to each other, and are at least partially on opposite sides of a reference line coinciding with an edge of a printed circuit board received in the housing, a risk of electrical leakage between the terminals is eliminated.

These and other advantages of the present subject matter would be described in greater detail in conjunction with the following figures. While aspects relating to a housing assembly provided with a heating device as described above and henceforth can be implemented in any number of terminals which are offset to each other to avoid electrical leakage, the embodiments are described in the context of the following system(s).

Figure 1A:
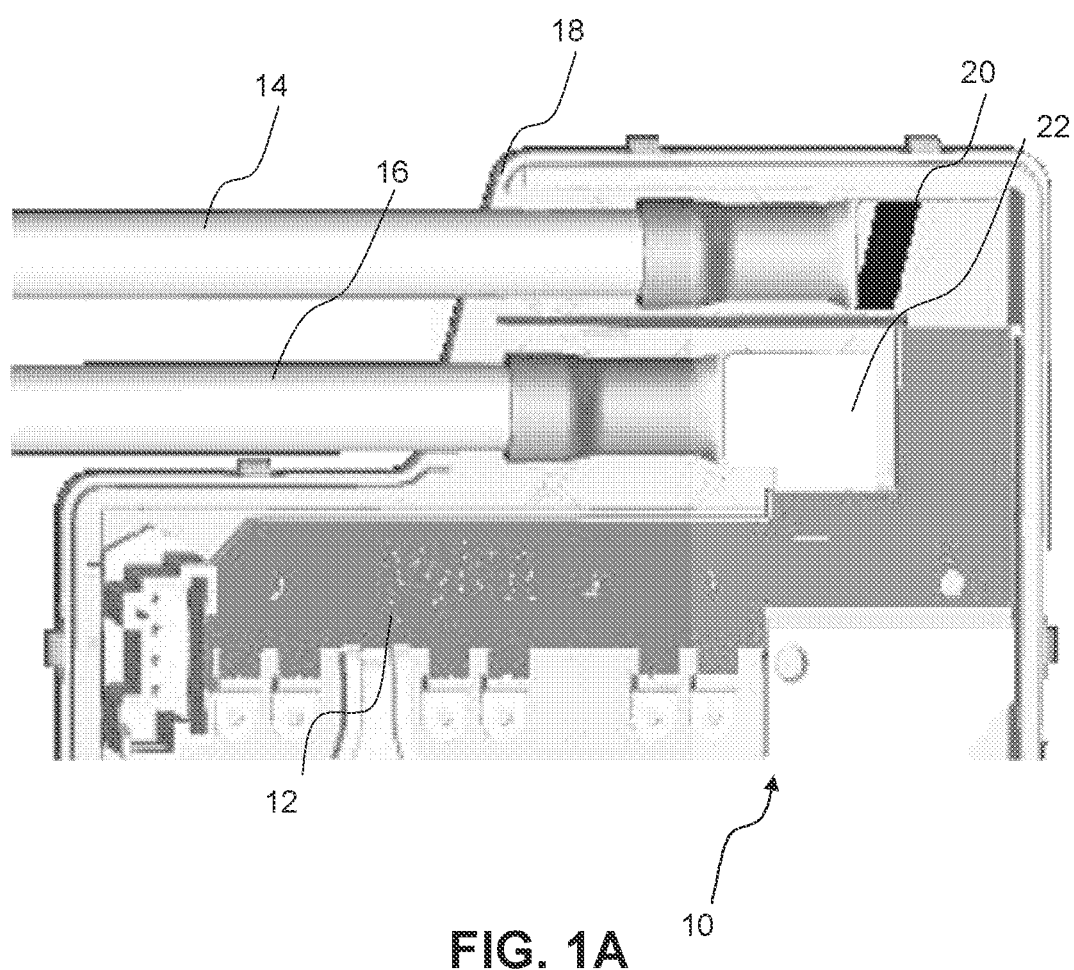
FIG. 1A illustrates a schematic view of a conventional housing assembly of a heater core, in accordance with an embodiment of a prior art.
Figure 1B:
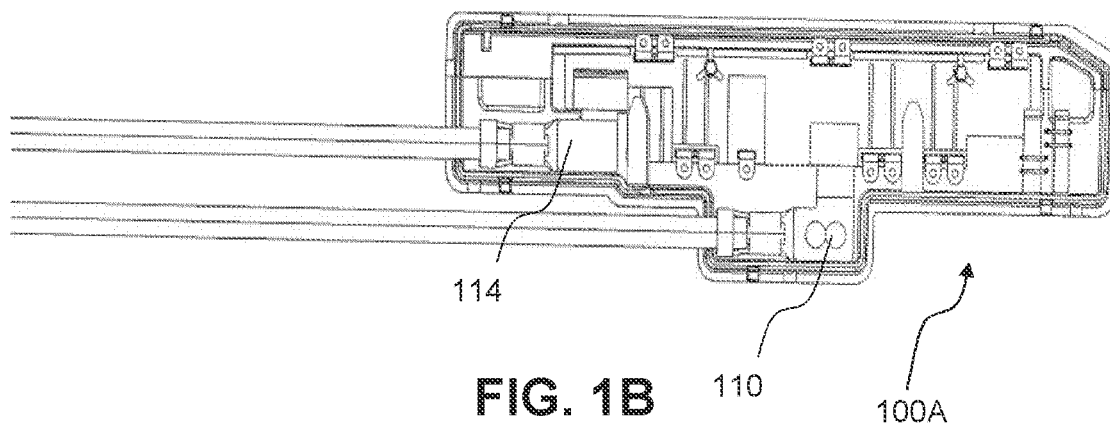
FIG. 1B illustrates a schematic view of a housing assembly of a heating device of the present subject matter.

FIGS. 1A and 1B illustrate a comparison of a conventional housing assembly with a housing assembly 100A of a heating device of the present subject matter. In one example, FIG. 1A illustrates a schematic view of the conventional housing assembly, and FIG. 1B illustrates a schematic view of the housing assembly 100A of the present subject matter. In conventional housing assembly 10 of FIG. 1A, the two terminals 20, 22 are placed adjacent to each other which may leads to current/potential leakage between the two terminals 20, 22. In contrast, two terminals 110, 114 of the housing assembly 100A of FIG. 1B are laterally offset to each other, thereby eliminating risk of potential leakage between the two terminals 110, 114. Further, construction and assembling of the housing assembly are described in forthcoming figures.

Figure 2A:
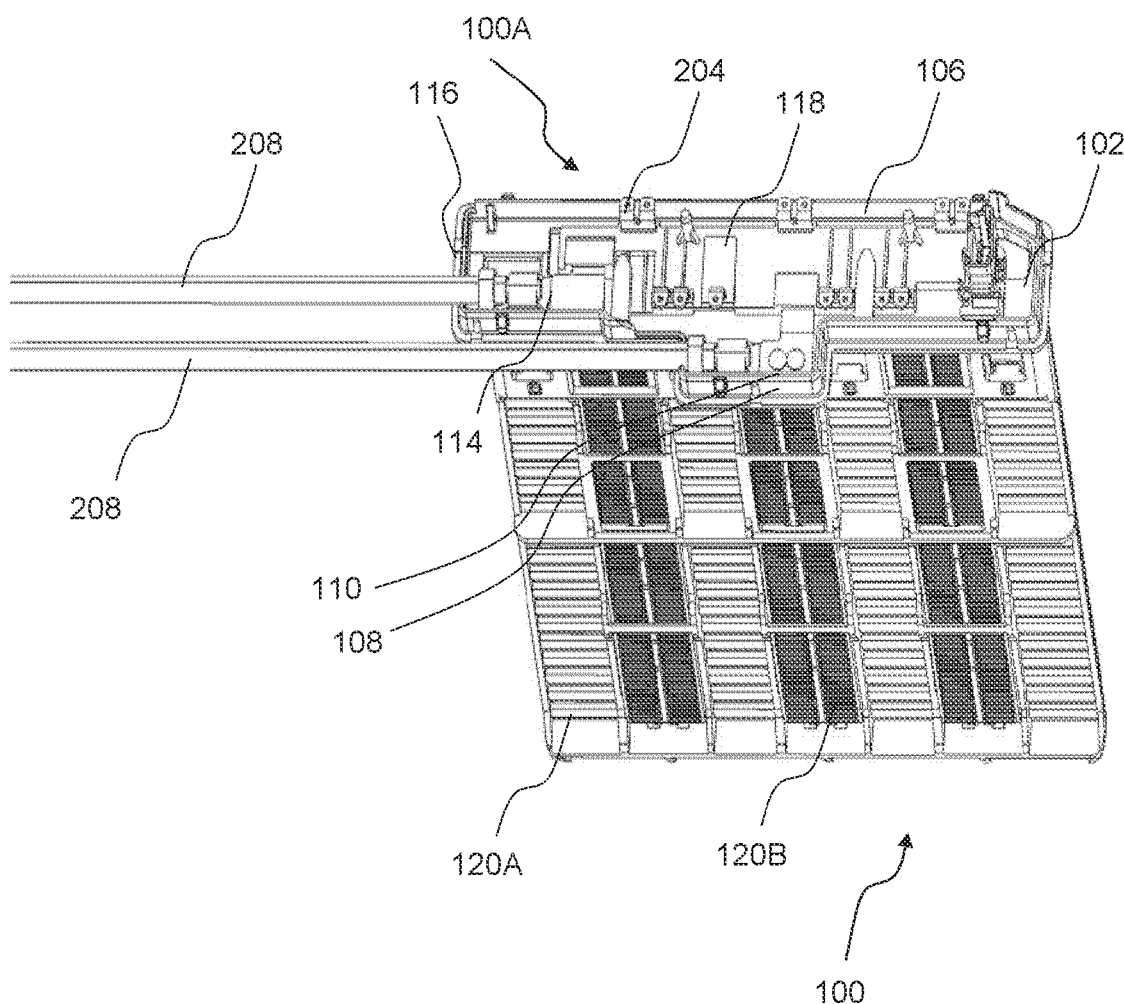
FIGS. 2A, 2B and 2C illustrate schematic views of a heating device provided with the housing assembly of FIG. 1B, in accordance with an embodiment of the present subject matter.
Figure 2B:
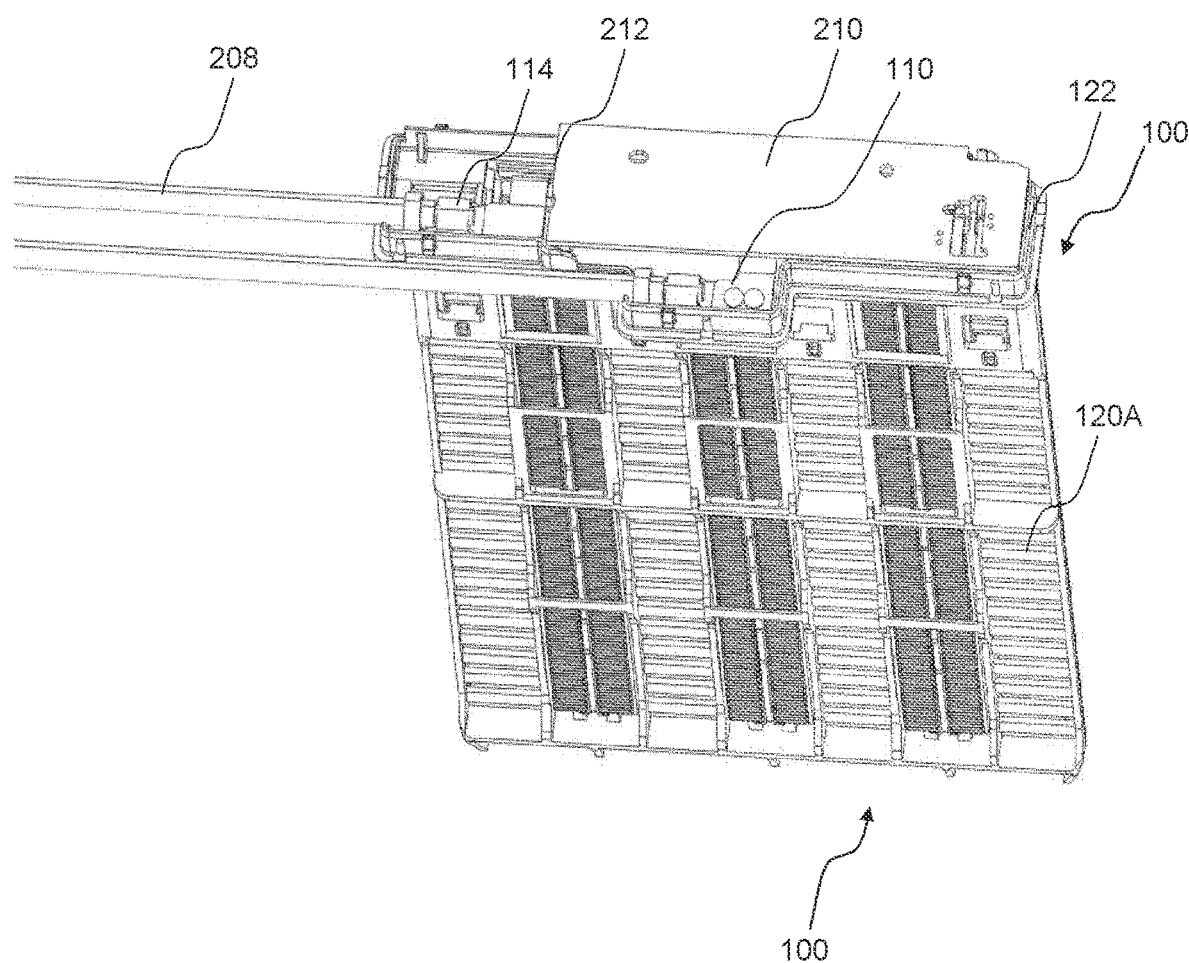
Figure 2C:
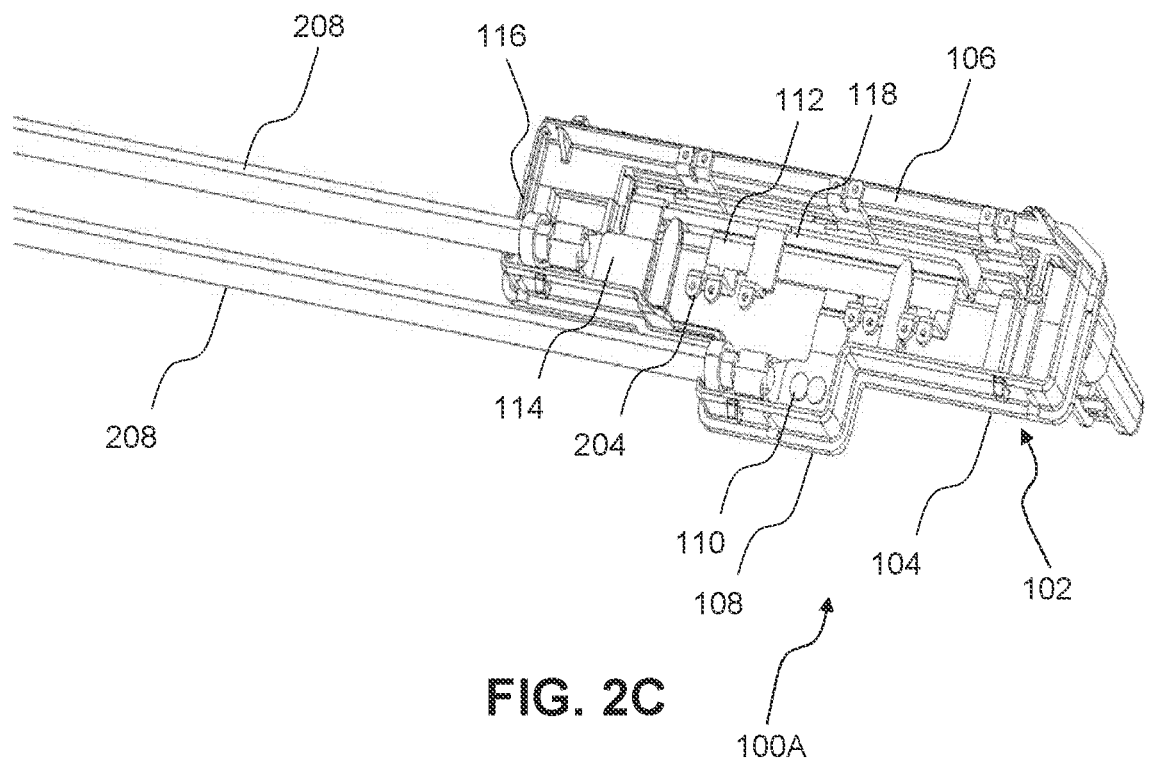

FIGS. 2A, 2B and 2C illustrate schematic isometric views of a heating device 100 provided with the housing assembly 100A of FIG. 1B, in accordance with an embodiment of the present subject matter. In one example, FIG. 2A illustrates a schematic view of the heating device 100 with the housing assembly 100A, FIG. 2B illustrates a schematic view of the heating device 100 having a Printed Circuit Board 210, and FIG. 2C illustrates a perspective view of the housing assembly 100A. The heating device 100 includes a heater core 120A having one or more heating elements 120B, and the housing assembly 100A. The housing assembly 100A being coupled on the heater core 120A and adapted to receive corresponding electrical contacts of the one or more heating elements 120B. The housing assembly 100A includes a housing 102, a first terminal 110, and a second terminal 114. In one embodiment, the housing 102 may be provided with a protruded portion 108. In one example, the protruded portion 108 may be formed on a wall of the housing 102. The housing 102 may include a first side wall 104 and a second side wall 106 which are coupled to each other. The housing 102 may further include a first bus bar 112, and a second bus bar 118 to connect the first terminal 110 and the second terminal 114 with corresponding electrical contacts of the one or more heating elements 120B.

The first terminal 110 may be configured on the protruded portion 108 of the housing 102 and is electrically connected to the first bus bar 112. The second terminal 114 may be configured on a first end 116 of the housing 102 and is electrically connected to the second bus bar 118. The housing 102 further receives a printed circuit board (PCB) (not shown in FIGS. 2A and 2B) to adjust heating power of the heater core 102A and provide protection function to the heater core 120A. In one embodiment, the PCB may be provided with control circuits (not shown in FIGS. 2A and 2B) to control supply of electrical energy to the heater core 120A and to avoid overheating of the heater core 120A. Further, the first terminal 110 and the second terminal 114 are laterally offset to each other, and are at least partially on opposite sides of a reference line coinciding with an edge 212 of the printed circuit board 210 received in the housing 102. In other words, the first terminal 110 and the second terminal 114 are provided in such a way that the first terminal 110 is diagonally anterior to the second terminal 114. The first terminal 110 and the second terminal 114 are connected to an electrical energy source by a pair of electrical conductors 208. In one embodiment, the pair of electrical conductors 208 is electrically insulated wires. In one embodiment, the housing 102 is a rectangular housing having a first side wall 104 and a second side wall 106.

Figure 3A:
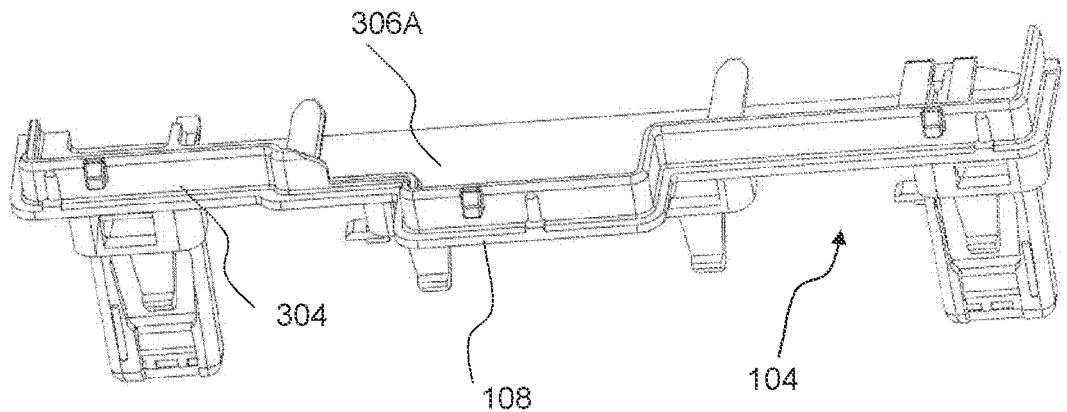
FIGS. 3A, 3B illustrate a first side wall and a second side wall of the housing of FIG. 2A, in accordance with an embodiment of the present subject matter.
Figure 3B:
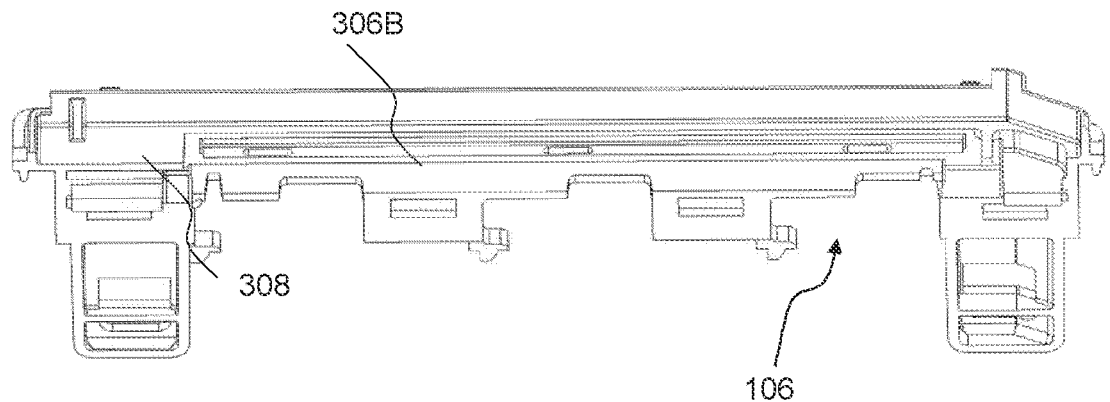
Figure 3C:
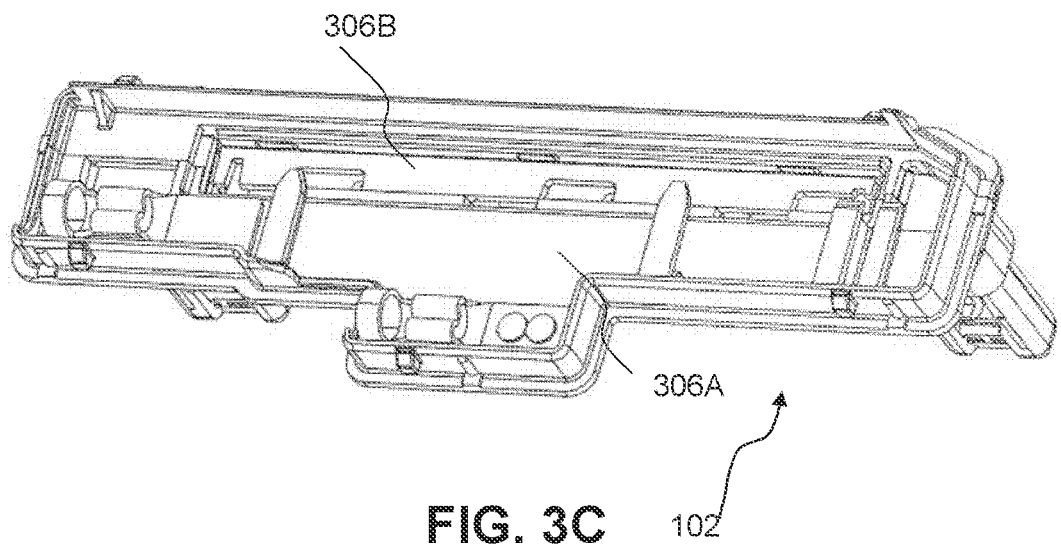
FIG. 3c illustrates an assembled view of the housing of FIG. 2A formed by assembling the first portion and the second portion of FIG. 3A and FIG. 3B respectively.

FIGS. 3A and 3B illustrate the first side wall 104 and the second side wall 106 of the housing 102 of FIG. 2A, in accordance with an embodiment of the present subject matter. In one embodiment, the housing 102 is formed by snap-fitting the first side wall 104 and the second side wall 106. In one example, the first side wall 104, as shown in FIG. 3A, includes a first vertical wall 304 having a first horizontal portion 306A. The first horizontal portion 306A may be perpendicularly coupled to the first vertical wall 304. In another example, the second side wall 106, as shown in FIG. 3B, includes a second vertical wall 308 having a second horizontal portion 306б perpendicular to the second vertical wall 308. The second horizontal portion 306B may be perpendicularly coupled to the second vertical wall 308 of the second side wall 106. In another embodiment, the first vertical wall 304, and the second vertical wall 308 are adapted to couple each other thereby coupling the first horizontal portion 306A with the second horizontal portion 306B as shown in FIG. 3C. In one example, the first side wall 104 is adapted to couple with the second side wall 106 to form a base portion. In one embodiment, the base portion may be a portion which forms when the first horizontal portion 306A is coupled the second horizontal portion 306B.

Figure 4:
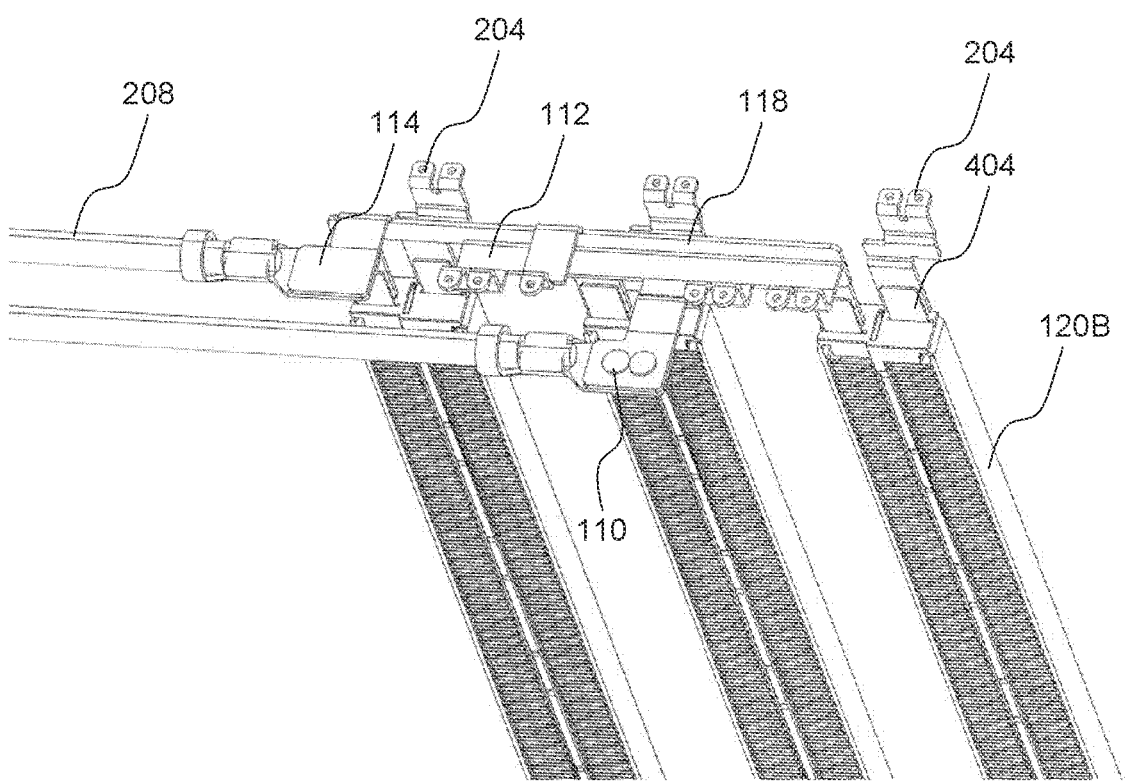
FIG. 4 illustrates a isometric view of the heating device of FIG. 2A, in accordance with an embodiment of the present subject matter.

FIG. 4 illustrates an exploded view of the heating device 100 of FIG. 2A, in accordance with an embodiment of the present subject matter. The electrical contacts 404 of the one or more heating elements 120B are coupled to the first bus bar 112 and the second bus bar 118 as shown in FIG. 4. Further, a plurality of connectors 204 is provided in the first bus bar 112 and the second bus bar 118 to couple the first bus bar 112 and the second bus bar 118 with the printed circuit board 210. The plurality of connectors 204 is coupled to the printed circuit board 210 to provide rigid support to the electrical contacts 404 of the one or more heating elements 120B. Further, the printer circuit board 210 is provided at a second end 122 of the housing 102 in such a way that the first terminal 110 and the second terminal 114 are adjacent to the orthogonal sides of the printed circuit board 210 respectively. In one embodiment, the second end 122 may be opposite to the first end 116. In another embodiment, the printed circuit board 210 may partially covers the first bus bar 112 and the second bus bar 118 as shown in FIG. 2B.

Figure 5:
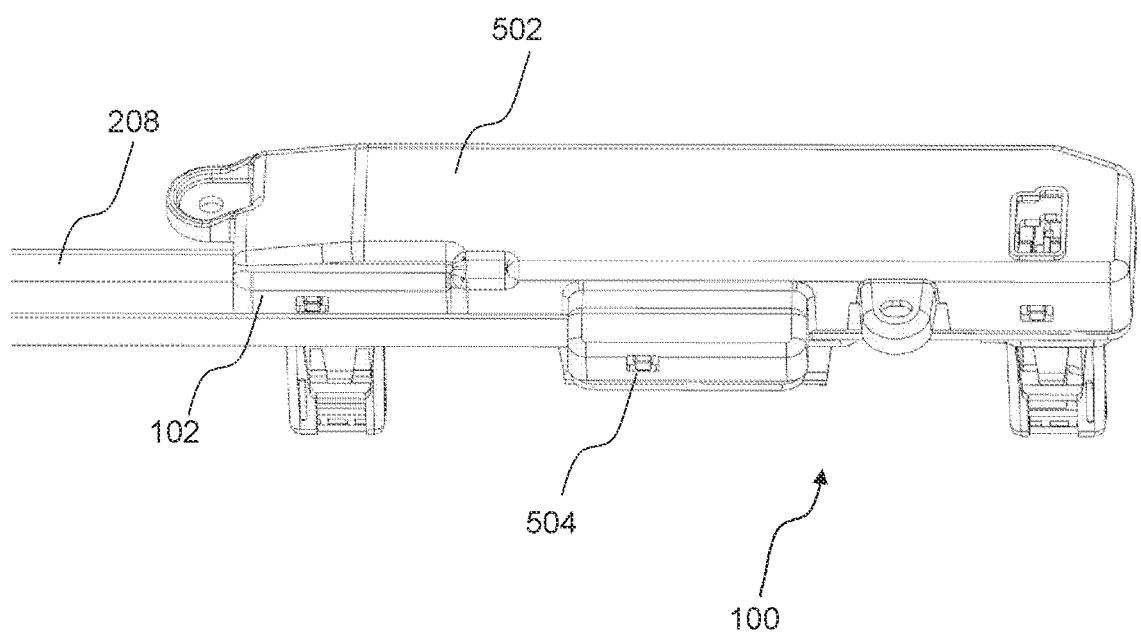
FIG. 5 illustrates a perspective view of the housing assembly having a top portion covered therein, in accordance with an embodiment of the present subject matter.

Further, the housing assembly 100A includes a top portion 502 adapted to couple with the housing 102 for encapsulating the first terminal 110, the second terminal 114, and the printed circuit board 210 as shown in the FIG. 5. In one embodiment, the top portion 502 is complementary to the housing 102 to enable engagement between each other. The housing assembly 100A further includes at least one locking assembly 504 to retain the housing 102 and the top portion 502 in a locked state. In one embodiment, the at least one locking assembly 504 being a snap-fit assembly having complementary engagement members provided on the housing 102 and the top portion 502 to lock the housing 102 with the top portion 502. In another embodiment, the housing assembly 100A may include multiple locking assemblies provided throughout the circumference of the housing 102 and the top portion 502. In one embodiment, the top portion 502 and the housing 102 are of an electrically insulated material. In one example, the heating device 100 can be provided in a fossil fuel vehicle to provide heat while cold starting an engine of the vehicle in a cold region. In another example, the heating device can be provided in a HVAC unit of an electric vehicle to provide hot air to the passengers in the vehicle's cabin.

Several modifications and improvement might be applied by the person skilled in the art to the housing assembly 100A as defined above, as long as it comprises the first terminal 110 and the second terminal 114 orthogonally offset to the first terminal 110.

In any case, the invention cannot and should not be limited to the embodiments specifically described in this document, as other embodiments might exist. The invention shall spread to any equivalent means and any technically operating combination of means.

The invention claimed is:

1. A housing assembly for facilitating electrical connectivity to a heater core of a heating device, comprising:
a housing is configured with a protruded portion;
a first terminal configured on the protruded portion of the housing and adapted to be electrically connected with a first bus bar; and
a second terminal configured on a first end of the housing and adapted to be electrically connected with a second bus bar,
wherein the first bus bar and the second bus bar are connected to the heater core to provide an electrical connectivity to the heater core,
wherein the first terminal and the second terminal are laterally offset to each other, and are at least partially on opposite sides of a reference line coinciding with an edge of a printed circuit board received in the housing.

2. The housing assembly as claimed in claim 1, wherein the housing comprises a first side wall and a second side wall adapted to be coupled to the first side wall, wherein the first side wall and the second side wall forms a base portion.

3. The housing assembly as claimed in claim 1, wherein the printed circuit board provided on a second end of the housing in such a way that the first terminal and the second terminal are adjacent to the orthogonal sides of the printed circuit board.

4. The housing assembly as claimed in claim 3, further comprising: a plurality of connectors connected to the first bus bar and the second bus bar to couple the first bus bar and the second bus bar with the printed circuit board.

5. The housing assembly as claimed in claim 1, further comprising a top portion adapted to couple with the housing for encapsulating the first terminal, the second terminal and the printed circuit board.

6. The housing assembly as claimed in claim 5, the top portion and the housing are of an electrically insulated material.

7. The housing assembly as claimed in claim 5, further comprising at least one locking assembly to retain the housing and the top portion in a locked state.

8. The housing assembly as claimed in claim 7, wherein the at least one locking assembly being a snap-fit assembly having complementary engagement members provided on the housing and the top portion to lock the housing with the top portion.

9. The housing assembly as claimed in claim 1, wherein the first terminal and the second terminal are connected to an electrical energy source by a pair of electrical conductors.

10. A heating device for a vehicle, comprising:
a heater core having a plurality of heating elements with corresponding electrical contacts;
a housing assembly adapted to be coupled on the heater core to receive electrical contacts of the heater core and provide electrical connectivity to the heater core, comprising:
a housing is configured with a protruded portion;
a first terminal configured on the protruded portion of a first side wall and adapted to be electrically connected with a first bus bar;
a second terminal configured on a first end of the base portion and adapted to be electrically connected with a second bus bar,
wherein the first bus bar and the second bus bar are connected to the heater core to provide an electrical connectivity to the heater core, characterized in that the first terminal and the second terminal are laterally offset to each other, and are at least partially on opposite sides of a reference line coinciding with an edge of a printed circuit board received in the housing.

* * * * *